US007710614B2

(12) United States Patent
Hanamoto

(10) Patent No.: US 7,710,614 B2
(45) Date of Patent: May 4, 2010

(54) IMAGE FORMING DEVICE

(75) Inventor: Katsuhiko Hanamoto, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1225 days.

(21) Appl. No.: 11/258,244

(22) Filed: Oct. 26, 2005

(65) Prior Publication Data

US 2007/0091333 A1 Apr. 26, 2007

(51) Int. Cl.
*H04N 1/46* (2006.01)

(52) U.S. Cl. ...................................... 358/474; 358/505

(58) Field of Classification Search ................. 358/474, 358/505

See application file for complete search history.

(56) References Cited

U.S. PATENT DOCUMENTS 5,210,600 A * 5/1993 Hirata ........................ 358/527
6,145,834 A * 11/2000 Hirota et al. ................ 271/225
6,640,082 B2 * 10/2003 Mitomi ...................... 399/374
7,280,257 B2 * 10/2007 Hsu ........................... 358/497
2003/0231357 A1 * 12/2003 Johnson et al. ............. 358/484

* cited by examiner

*Primary Examiner*—Benny Q Tieu
*Assistant Examiner*—Paul F Payer
(74) *Attorney, Agent, or Firm*—Shinjyu Global IP

(57) ABSTRACT

A bottom plate 25 is formed so as to open and close over substantially the entire bottom side of a document transport device 2, which is provided on the top of an image forming device, the bottom face of the bottom plate 25 being a pressure face for pressing against a document. The bottom plate 25 can be swung around a pivot 25*a*, and engages with a document transport device main body 21 by way of a document transport path bottom member 21. One end of the document transport path bottom member 71 is swingably supported by the document transport device main body 21, and a pin 71*a* that is provided at the other end thereof slidably engages in a groove 25*c* in a side wall 25*b* that is provided on the swinging end of the bottom plate 25, so as to open together with the bottom plate 25.

5 Claims, 6 Drawing Sheets

IMAGE FORMING DEVICE

FIELD OF THE INVENTION

The present invention relates to an image forming device comprising a document transport device.

BACKGROUND INFORMATION

At the present time, it is common to use image forming devices having document reading functions such as copiers, fax machines and scanners, which are provided with document transport devices. Document transport devices comprise a multiplicity of rollers on a document transport path, and because the document transport path turns, the internal mechanisms are complex and a the documents can be in various types of paper and various formats, documents sometimes jam in the internal document transport path. At this point, in order to remove the jammed document, it is necessary to expose the document transport path within the document transport device.

Furthermore, in the case of copiers capable of reading both sides of the document at the same time, a document reading area is also provided within the document transport device, and it is also necessary to expose the interior of the document transport device in order to clean that document reading area.

In terms of means for exposing the document transport path, means have been proposed wherein an external cover is opened to expose the interior from the top, and those wherein the document transport device (automatic document transport device) is opened with respect to the transparent glass platen (contact glass) so as to expose the pressure plate on the bottom thereof, whereafter an auxiliary frame is swung open from the top, so as to expose the document transport path from the underside thereof.

Furthermore, conventionally, devices have been proposed wherein the document transport device is opened with respect to the transparent glass platen (glass plate) and a bottom auxiliary frame is opened to expose the document transport path.

Furthermore, a plastic pressure sheet, which is backed with a soft material such as sponge, is generally mounted on the underside of the document transport device, so that the document that is placed on the transparent glass platen lies closely against the platen.

However, in the first mentioned prior art, it is not possible to expose the document transport path without first removing the external cover, which is bothersome and requires that a space be available in which the external cover that has been removed can be placed.

Furthermore, in the second mentioned prior art, with devices wherein a bottom auxiliary frame is opened to expose the document transport path, if the pressure sheet (document hold-down plate) is made from a soft material, the pressure sheet is bent, and this bending crease may result in the document not being sufficiently pressed against the transparent glass platen, so that the document cannot be read properly.

Thus, an object of the present invention is to provide an image forming device wherein the document transport device used in the image forming device allows for exposure of the interior of the document transport device from the bottom by a single operation, and wherein the pressure sheet is not bent when the interior of the document transport device is exposed.

SUMMARY OF THE INVENTION

In order to achieve this object, in the image forming device according to the present invention are provided a transparent glass platen and a document transport device at the top thereof, the document transport device being hinged at one side thereof so as to open and close in a perpendicular plane and having a document transport unit at one end thereof in the direction of the hinging axis, a first document reading device for reading a document being disposed below the platen, and there being defined on the top side of the platen, successively from the upstream side in the direction of transport of the document which is automatically transported along a document transport path by the document transport unit, an automatic-transport document reading area and a static document reading area, for reading, by the first document reading device, an automatically transported document and a document that is statically disposed on the platen, respectively; and the image forming device comprises: on the bottom side of the document transport device, a bottom plate that covers a portion thereof that faces the static document reading area, downstream in the direction of transport of the document, from the portion facing the automatic-transport document reading area, this bottom plate being supported so as to be able to open and close at the document transport device, and having as a swing pivot a swing axis that is orthogonal to the hinging axis at the terminus thereof that is distal with respect to the automatic-transport document reading area, the bottom side thereof being a pressure face for pressing down on a document placed on the static document reading area; and a document transport path bottom member, which constitutes a bottom side of the document transport path, which is disposed downstream from the automatic-transport document reading area on the document transport path, this document transport path bottom member being swingably supported by a document transport device main body, one end thereof being the center of swing and the other end thereof being a slide engagement unit for slidably engaging in the swinging end of the bottom plate, the bottom plate swinging in conjunction with the swing of this document transport path bottom member.

Furthermore, in the image forming device of the present invention, a second document reading device is provided within the document transport unit for reading the surface of the document that is opposite to the surface that is read by the automatic-transport document reading area, this second document reading device being disposed in a position opposite from the document transport path bottom member.

Furthermore, in the image forming device of the present invention, the slide engagement unit comprises a groove formed in a side wall that is formed on the bottom plate so as to extend in parallel to the direction of swing of the bottom plate and a connecting pin provided on the end of the document transport path bottom member that connects with the bottom plate, the groove being inclined downward in the direction of the swinging end of the bottom plate.

Furthermore, in the image forming device of the present invention, a handle is provided on the document transport path bottom member.

Furthermore, the image forming device of the present invention comprises a locking means consisting of a locking pin provided on the document transport path bottom member and a hook provided on the interior side of the outer case of the document transport device for engaging with the locking pin, the locking means serving to hold the bottom plate closed.

Furthermore, in the image forming device of the present invention, a biasing means for biasing the bottom plate in the direction that presses down on a document statically placed on the platen are mounted in the vicinity of both ends of the swing pivot of the bottom plate of the document transport device and in the vicinity of the connecting pin of the document transport path bottom member.

In the image forming device of the present invention, a bottom plate covers a portion of the bottom side of the document transport device from a portion downstream in the direction of transport of the document, with respect to the portion that faces the automatic-transport document reading area, to a portion that faces the static document reading area, and this bottom plate is supported by the document transport device so as to be able to open and close. Because the swinging end of this bottom plate and the document transport device main body are connected by a swingable document transport path bottom member, when the bottom plate is opened with the document transport device open, the document transport path bottom member swings at the same time, so that the interior of the document transport unit can be exposed, and because the bottom plate is not open to a greater extent than necessary, problems such as the opened bottom plate striking the platen are avoided. Furthermore, because the bottom face of this bottom plate serves as a document pressure face, it does not bend in the manner of a pressure sheet made from a soft material.

Furthermore, according to the present invention, a second document reading device is provided within the document transport unit for reading the face of the document that is opposite to the face that is read by the automatic-transport document reading area, whereby both sides of the document that is automatically transported can be read at the same time.

Furthermore, according to the present invention, because the slide engagement unit comprises a groove formed in a side wall that is formed on the bottom plate and a connecting pin provided on that end of the document transport path bottom member that is connected to the bottom plate, and because the position of the groove is inclined downwards in the direction of the swinging end of the bottom plate, when seen with the document transport device level, it is possible to avoid a situation wherein the opening action of the bottom plate is converted to a closing action during the swing of the document transport path bottom member, when the bottom plate is opened.

Furthermore, according to the present invention, a handle is provided on the document transport path bottom member, whereby the bottom plate can easily be opened.

Furthermore, according to the present invention, a locking means for holding the bottom plate closed is provided between the document transport device and the document transport path bottom member so that, when the document transport device is opened, the bottom plate will not be opened unintentionally.

Furthermore, according to the present invention, a biasing means for biasing the bottom plate in the direction that presses down on the document on the platen are mounted in the vicinity of both ends of the swing pivot of the bottom plate on the document transport device and in the vicinity of the connecting pin on the document transport path bottom member, whereby the document tends to be in close contact with the platen.

DETAILED DESCRIPTION OF THE PREFERRED EMBODIMENTS

Figure 1:
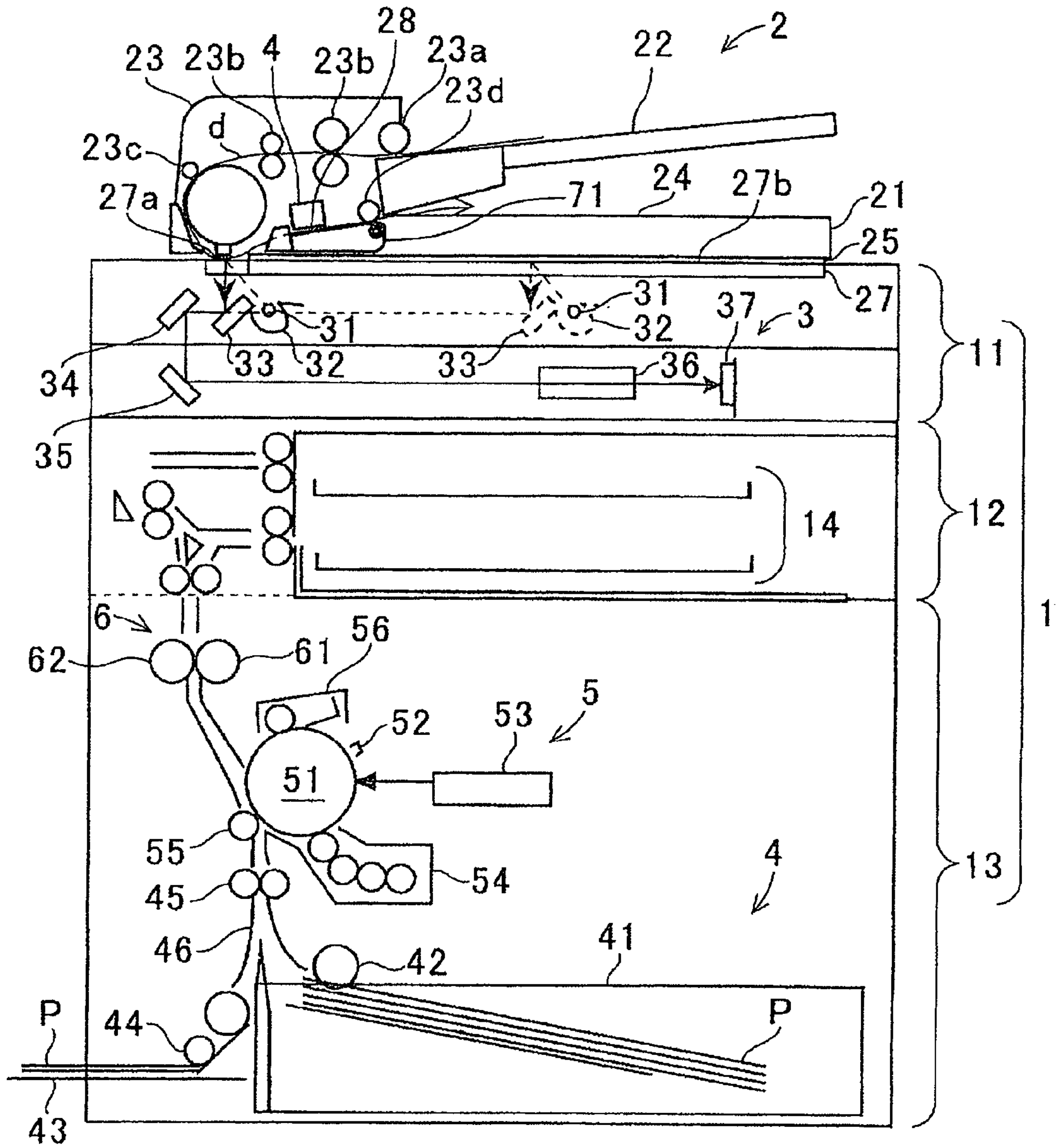
FIG. 1 is a schematic structural view of a copier.

Hereafter, a mode of embodiment of the present invention is described with reference to the drawings. FIG. 1 is a schematic structural view of a copier according to a mode of embodiment of the image forming device of the present invention. A main housing 1 comprises an upper housing 11, a lower housing 13 and a connecting housing 12 situated therebetween; and a document transport device 2 is mounted on the upper housing 11. The document transport device 2 is mounted in a hinged manner with the hinge pivot at the far end of the paper face.

The document transport device 2 comprises a document transport device main body 21, a document loading unit 22, a document transport unit 23, a document output tray 24 and a bottom plate 25. The document output tray 24 is formed integrally with the document transport device main body 21, as a portion of the upper face thereof. The document loading unit 22 constitutes the upstream terminus of a document transport path d, and the document output tray 24 constitutes the downstream terminus of the document transport path d. The document transport path d within the document transport unit 23 comprises, in order of the direction of document transport from the upstream end, a pickup roller 23*a*, a pair of transport rollers 23*b*, a pair of resist rollers 23*c*, a document transport path bottom member 71, which constitutes the bottom side of the document transport path d, and a pair of output rollers 23*d*. Along the document transport path d, in the section extending from the pair of resist rollers 23*c* to the document transport path bottom member 71 are defined an automatic-transport document reading area 27*a* and an automatic-transport document backside reading area 28, and a second document reading device 4 is provided. The automatic-transport document reading area 27*a* is defined on the top side of the transparent glass platen 27, on top of the upper housing 11, and the automatic-transport document backside reading area 28 is defined on the top side of the document transport path bottom member 71. The second document reading device 4 is provided facing the document transport path bottom member 71, within the document transport unit 23.

When a copy start button (not shown in the drawing) is pressed, a document (not shown in the drawing) having images on both sides thereof, which is set in the document loading unit 22, is transported along the document transport path d by the rollers, and the image on one side thereof is read by the first document reading device 3 at the automatic-transport document reading area 27*a* while the image on the other side thereof is read by the second document reading device 4 at the automatic-transport document backside reading area 28, both areas being defined on this path. The bottom plate 25 is formed on the bottom of the document transport device 2, from a point immediately downstream from the automatic-transport document reading area 27*a* on the document transport path d, to a terminus at which the document transport unit 23 of the document transport device main body 21 is not provided. Furthermore, the bottom side of the bottom plate 25 serves as a pressure face for pressing down from above on the document that has been placed on the platen 27. Here, a pressure sheet made from soft materials, comprising a base made from sponge or the like, and a sheet made from vinyl or the like, which is fixed on the side of the base that contacts the document, may be mounted on the bottom side of the bottom plate 25.

The first document reading device 3 is housed within the upper housing 11. The first document reading device 3 comprises an exposing lamp 31, a reflecting plate 32, a first mirror 33, a second mirror 34, a third mirror 35, a condensing lens 36 and an image sensor (for example a line type CCD) 37. The exposing lamp 31 and the first mirror 33 are mounted on a first carriage (not shown in the drawing), and the second mirror 34 and third mirror 35 are mounted on a second carriage (not shown in the drawing). When the document image is read in what is known as the sheet-through mode, the first carriage travels to a position directly below the automatic-transport document reading area 27*a*, and the document is exposed to irradiation light from the exposing lamp 31, while it moves. This irradiation light reaches the CCD 37 by way of the first mirror 33, the second mirror 34, the third mirror 35 and the condensing lens 36 and is read as an electrical signal by way of photoelectric conversion processing. Meanwhile, when the document image is read in the stationery document mode, the image on a document that is placed over the static document reading area 27*b*, which is defined on the transparent glass platen 27, is scanned by the exposing lamp 31 and the first mirror 33 on the first carriage, which moves to the right in FIG. 1, under the platen 27, so as to perform reduction imaging onto the CCD 37, thereby reading the image as an electrical signal by way of photoelectric conversion processing.

Only when in sheet through mode, in the same manner as with the automatic-transport document reading area 27*a*, the document image is likewise read as an electrical signal at the automatic-transport document backside reading area 28, using an exposing device housed in the second document reading device 4.

A paper output tray 14 is provided in the connecting housing 12 for outputting paper P on which an image has been formed.

The lower housing 13 houses a paper feed unit 4, an image forming unit 5 and a fixing device 6. First, the paper feed unit 4 will be described. The paper feed unit 4 consists of a paper feed cassette 41, a paper feed roller 42, a paper feed tray 43, a paper feed roller 44 and a pair of transport rollers 45. The paper feed cassette 41 for storing the paper P is disposed at the bottom of the lower housing 13, and the paper P is fed out therefrom one sheet at a time to a paper transport path 46, by the paper feed roller 42 and transported by the transport rollers 45. Furthermore, the paper feed tray 43, which can be opened and closed, is provided at the bottom left-hand side of the lower housing 13, and by placing the paper P therein, the paper P is fed out one sheet at a time by the paper feed roller 44 to the paper transport path 46 and transported by the transport rollers 45 in the same manner as described above.

Next, the image forming unit 5 will be described. The image forming unit 5 comprises a photosensitive drum 51, a charger 52 disposed at the periphery thereof, an optical scanning unit 53, a developer 54, a transfer roller 55 and a cleaner 56. The photosensitive drum 51 rotates clockwise so that, first of all, the surface of the photosensitive drum 51 is uniformly charged by the charger 52. Next, the surface of the photosensitive drum 51 is irradiated with laser light from the optical scanning unit 53 so as to eliminate the charge from areas corresponding to those portions of the paper P on which the image is to be formed, or corresponding to those portions of the paper P on which the image is not to be formed, so as to form an electrostatic latent image on the surface of the photosensitive drum 51. Next, the electrostatic latent image is made manifest by supplying toner to the electrostatic latent image on the photosensitive drum 51 with the developer 54.

The photosensitive drum 51 further rotates so that, when the toner image reaches a position opposite the transfer roller 55, in coordination therewith, paper P is transported between the photosensitive drum 51 and the transfer roller 55. At this time, by applying to the transfer roller 55 a voltage having a polarity opposite to the polarity of the toner, the toner image on the photosensitive drum 51 is transferred onto the paper P. The remaining toner on the photosensitive drum 51, which was not transferred, is removed from the photosensitive drum 51 by the cleaner 56. Meanwhile, the paper P onto which the toner image has been transferred is transported to the fixing device 6, which consists of a fixing roller 61 and a pressure roller 62 that are brought into contact by pressure, where the toner image is heated and pressed so as to fix it on the paper. Thereafter, the paper P is output to the output tray 14 by way of an output path.

Figure 2:
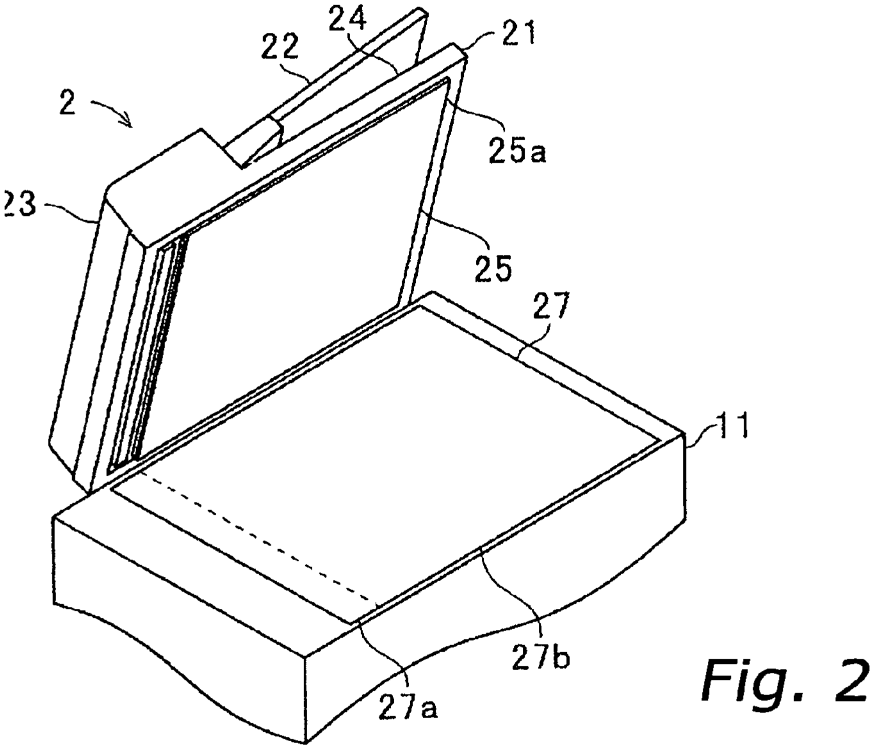
FIG. 2 is an external perspective view of the upper part of a copier with the document transport device opened and the bottom plate closed.

In the present invention, as shown in the external perspective view of the top of an image forming device with the document transport device 2 open in FIG. 2, the bottom side of the document transport device 2 is formed with a bottom plate 25 at that portion thereof that faces the static document reading area 27*b*, downstream in the direction of the transport of the document with respect to the portion facing the automatic-transport document reading area 27*a*.

Figure 3:
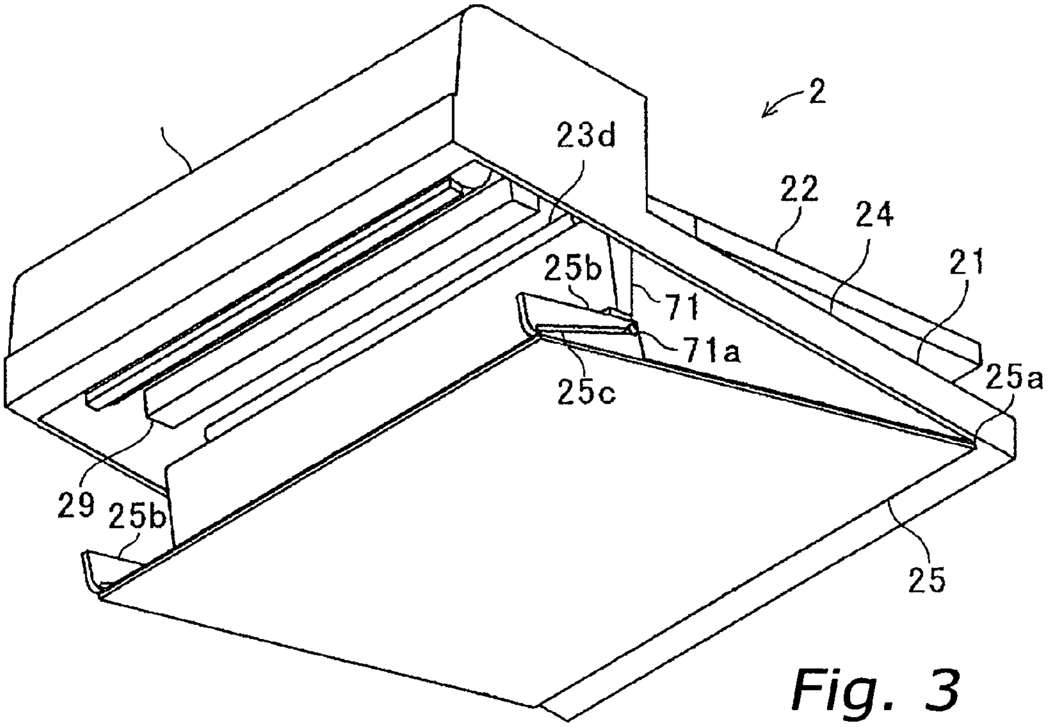
FIG. 3 is an external perspective view from the bottom of a document transport device with the bottom plate opened.
Figure 4:
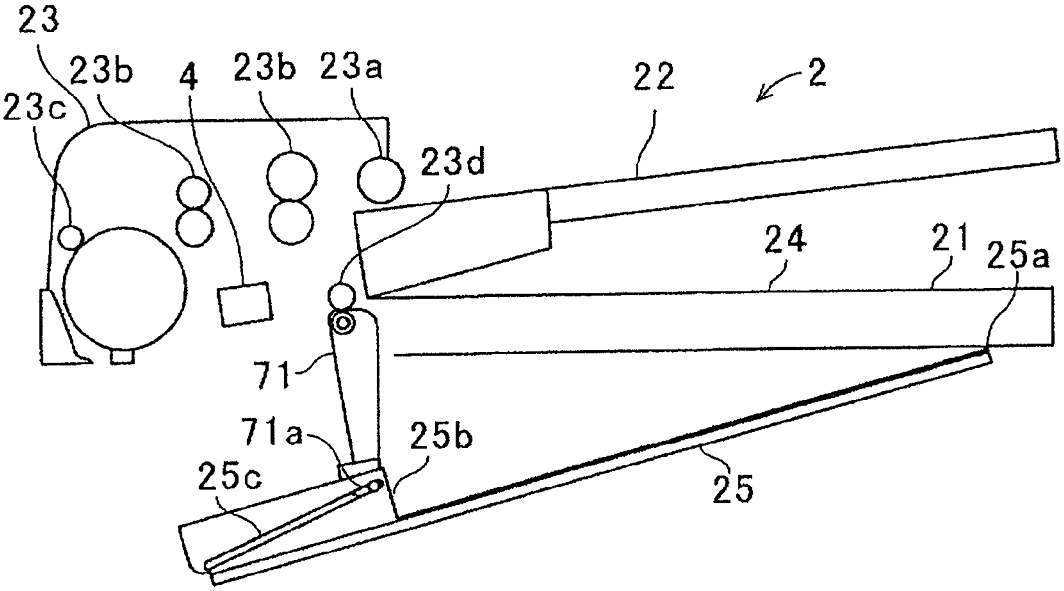
FIG. 4 is a schematic structural view of a document transport device with the bottom plate opened.
Figure 5A:
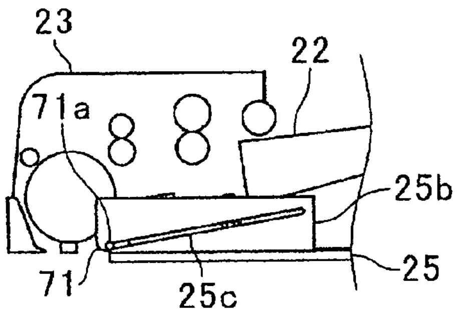
FIG. 5A to FIG. 5D are partial schematic structural views illustrating how the bottom plate is opened.
Figure 5B:
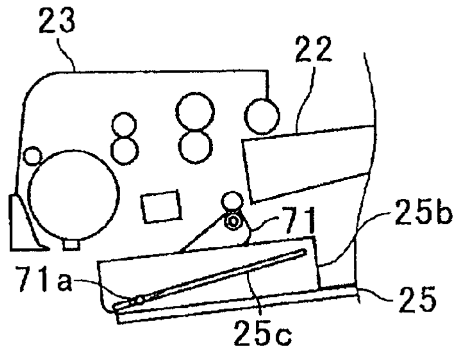
Figure 5C:
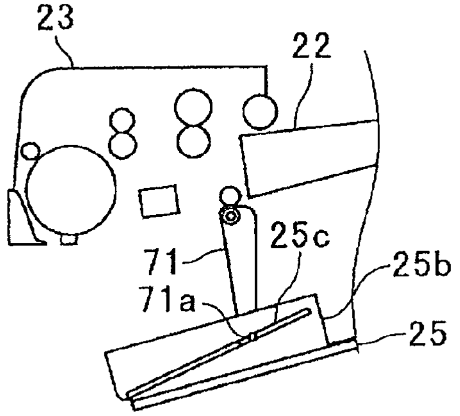
Figure 5D:
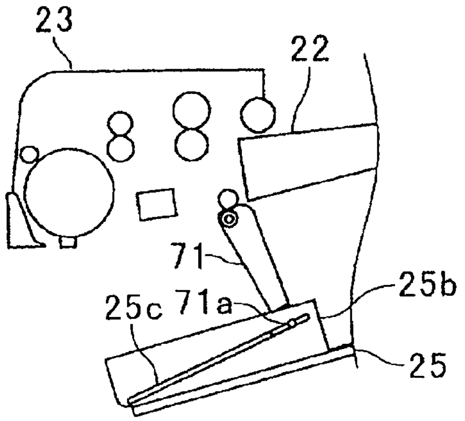

As shown in FIG. 2, when the document transport device 2 is open, the bottom plate 25 can be opened in the manner shown in the external perspective view and the schematic structural views, seen from the front, of the document transport device 2 shown in FIG. 3 and FIG. 4. The bottom plate 25 is supported by the document transport device main body 21 in a hinged manner, hinging on a pivot 25*a* at the distal terminus thereof with respect to the portion facing the automatic-transport document reading area 27*a*. Furthermore, the bottom plate 25 is provided with a groove 25*c* in a side wall 25*b*, which is formed so as to extend in parallel with the direction of opening and closing of the bottom plate 25. Here, the document transport path bottom member 71, described above, is swingably supported, at one end thereof, by the document transport device 2, and a connecting pin 71*a* is provided at the other end thereof, this connecting pin 31*a* being slidably inserted into the groove 25*c*. The groove 25*c* is provided at a downwards inclination in the direction of the swinging end of the bottom plate 25, as seen when the document transport device 2 is level.

The manner in which the bottom plate 25 is opened is schematically illustrated in FIG. 5A through FIG. 5D. As the bottom plate 25 is opened by hand and the document transport path bottom member 71 is swung, the connecting pin 71*a*, which is provided on the document transport path bottom member 71, slides in the groove 25*c*, which is provided in the side wall 25*b*, that is formed on the bottom plate 25. It will be understood that, because the groove 25*c* is provided at a downwards inclination in the direction of the swinging end of the bottom plate 25, as seen when the document transport device 2 is level, even if the document transport path bottom member 71 continues to swing after the connecting pin 71*a* passes the bottom dead center, the opening action of the bottom plate 25 will continue, without being converted to a closing action.

By virtue of this constitution, when the bottom plate 25 is opened with the document transport device 2 in the open state, the document transport path bottom member 71 swings so that the interior of the document transport unit 23 can be exposed from the bottom of the document transport device 2, whereby a document jammed in the document transport unit 23 can easily be removed and the second document reading device 4 can easily be cleaned. Furthermore, because the document transport path bottom member 71 does not allow the bottom plate 25 to be opened more than is necessary, with respect to the document transport device 2, problems such as the opened bottom plate 25 striking the platen 27 are eliminated. Furthermore, the bottom plate 25 does not bend, even when opened, so that there is no risk of the document being improperly read because of insufficient pressing of the document against the platen 27, due to bending creases, such as occur when soft pressure sheets are bent by opening.

Furthermore, because the groove 25*c* is provided at a downwards inclination in the direction of the swinging end of the bottom plate 25, as differs from a case in which the groove 25*c* and the bottom plate 25 are separated by a parallel interval, the movement of the bottom plate 25 is not converted to a closing movement during the swing of the bottom plate 25, so that it is possible to sufficiently expose the interior of the document transport unit 23, whereby documents jammed in the document transport unit 23 can easily be removed and the document reading device 4, as well as the document transport path bottom member 71, can easily be cleaned.

Figure 6:
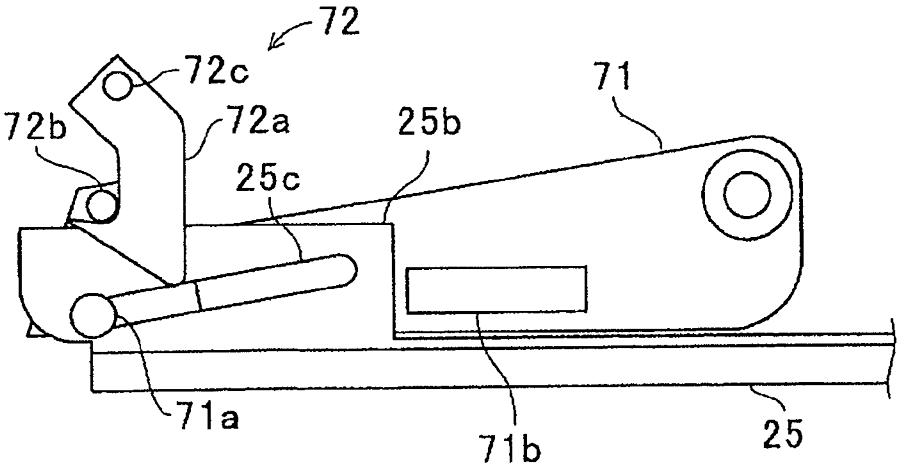
FIG. 6 is a schematic structural view as seen from the front of the periphery of the document transport path bottom member when a handle and a hook are provided.

FIG. 6 is a schematic structural view of the vicinity of the document transport path bottom member 71, as seen from the front. A handle 71*b* is provided on the document transport path bottom member 71, and a locking means 72 is provided between the document transport device 2 and the document transport path bottom member 71.

The handle 71*b* is located in a position whereby it does not hide behind the side wall 25*b* formed on the bottom plate 25 when the bottom plate 25 is closed. The locking means 72 consists of a hook 72*a* and a locking pin 72*b*, provided on the document transport path bottom member 71. The hook 72*a* is provided rotatably on the interior of the outer case of the document transport device 2, with the top end thereof serving as a pivot 72*c*, and is biased in the right hand rotational direction around the pivot 72*c* by a biasing means. When the bottom plate 25 is closed, the hook 72*a* is engaged with the locking pin 72*b*, and when the bottom plate 25 is to be opened, the hook 72*a* is moved in the left hand rotational direction around the pivot 72*c*, so as to disengage the hook 72*a* from the locking pin 72*b*.

Thus, by providing the handle 71*b* on the document transport path bottom member 71, the bottom plate 25 can easily be opened. Furthermore, if there is no handle 71*b*, when the bottom plate 25 is to be opened, this may be opened by grasping not only the bottom plate 25, but also the document transport path bottom member 71 with a hand, but if the handle 71*b* is present, it is not necessary to touch the paper transport surface of the document transport path bottom member 71 or the face of the bottom plate 25 that is contacted by the paper, whereby it is possible to avoid such problems as being soiled by the dirt in these places. Furthermore, because of the locking means 72, the bottom plate 25 is not unintentionally opened when the document transport device 2 is opened.

Figure 7:
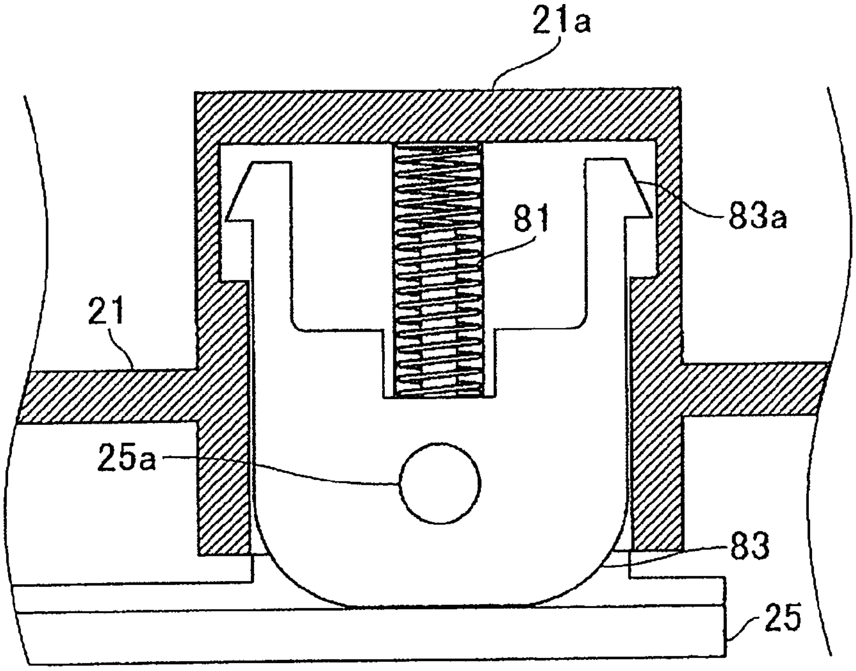
FIG. 7 is a schematic structural view of the vicinity of a bottom plate pivot provided with a biasing means.
Figure 8:
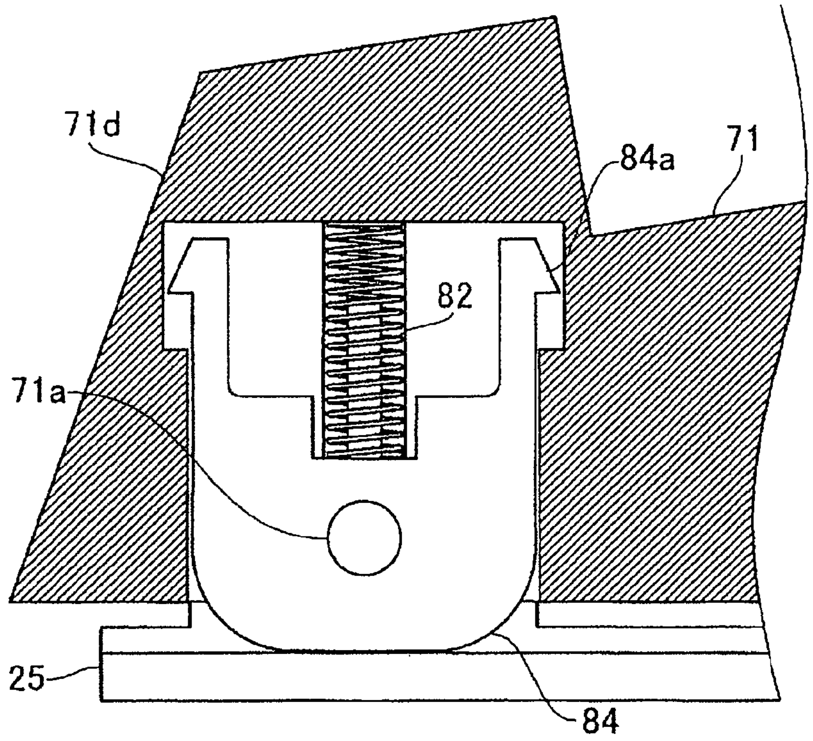
FIG. 8 is a partial schematic structural view of a document transport path bottom member provided with a biasing means.

FIG. 7 and FIG. 8 are schematic structural views of the periphery of the pivot 25*a* for the bottom plate 25, and the periphery of the document transport path bottom member 71. In the vicinity of both ends of the pivot 25*a* and the connecting pin 71 of the document transport path bottom member 71 are mounted springs 81 and springs 82 for biasing the bottom plate 25 in the direction that presses down on the document on the platen 27.

As shown in FIG. 7, the pivot 25*a* is provided in a floating member 83. The floating member 83 is housed in a pocket 21*a* formed in the document transport device main body 21, and is capable of traveling along a fixed stroke in the vertical direction as shown in the drawing. The floating member 83 is biased in the direction whereby it is pushed out from the pocket 21*a* by the spring 81. When the floating member 83 is inserted into the pocket 21*a*, hooks 83*a*, which are provided on the floating member 83, are flexed in the opening of the pocket 21*a*, and when inserted to a certain degree into the pocket 21*a*, the flexure returns to its original state, so that the floating member 83 is prevented from coming out of the pocket 21*a* by the hooks 83*a*.

Figure 9:
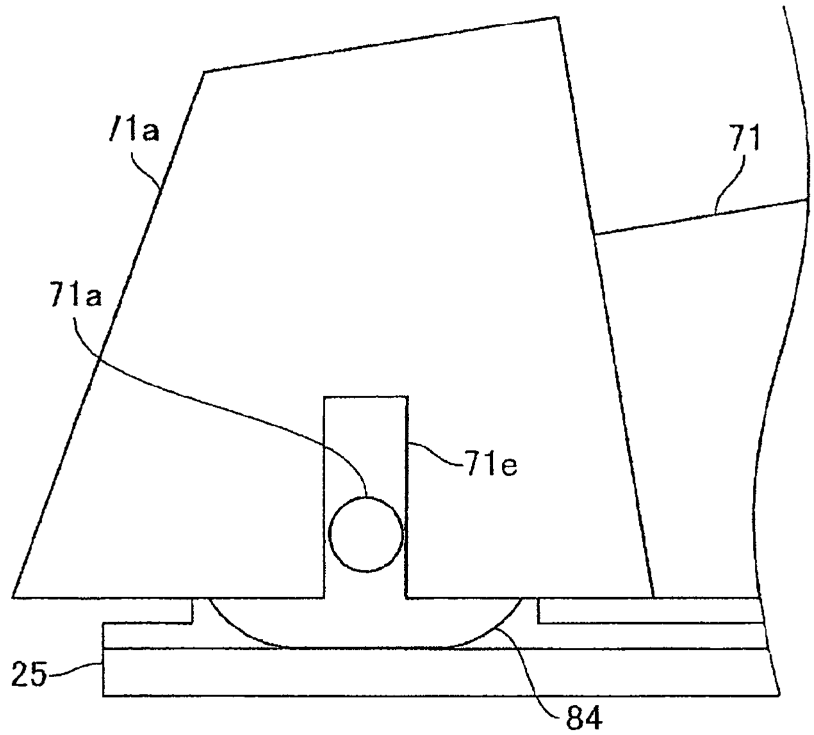
FIG. 9 is a partial external front view of a document transport path bottom member provided with a biasing means.

Likewise, the connecting pin 71*a* is provided in a floating member 84 as shown in FIG. 8. The floating member 84 is housed in a pocket 71*d* formed in the document transport device bottom member 71, and is capable of traveling along a fixed stroke in the vertical direction as shown in the drawing. The floating member 84 is biased in the direction whereby it is pushed out from the pocket 71*d* by the spring 82. When the floating member 84 is inserted into the pocket 71*d*, hooks 84*a*, which are provided on the floating member 84, are flexed in the opening of the pocket 71*d*, and if inserted to a certain degree into the pocket 71*d*, the flexure returns to its original state, so that the floating member 84 is prevented from coming out of the pocket 71*d* by the hooks 84*a*. Furthermore, FIG. 9 is an external view of the part shown in FIG. 8. The connecting pin 71*a* is exposed by a groove 71*e*, which is provided in the document transport path bottom member 71.

The floating member 83 can move, vertically as seen in the drawing, within the range of a fixed stroke allowed by the movement of the hooks 83*a* in the pocket 21*a*, and is pushed into the pocket 21*a* under bias by the spring 81 when the document transport device 2 is closed. The floating member 84 can likewise move, vertically as seen in the drawing, within the range of a fixed stroke allowed by the movements of the hooks 84*a* in the pocket 71*d*. Both FIG. 8 and FIG. 9 show the situation when the document transport device 2 is closed. When the document transport device 2 is opened, the floating members 83 and the floating number 84 are pushed out in the downward direction as seen in the figure by the spring 81 and the spring 82.

By virtue of this constitution, when a document having a fold is placed on the platen 27, even if this does not lie flat, the bottom plate 25 is biased by the spring 81 and the spring 82 by closing the document transport device 2 so that the document is in close contact with the platen 27 and the image can be read properly.

In the present invention, the second document reading device 4 maybe omitted, and in this case two-sided reading of a document having images on both sides is possible by separately reading the frontside and backside of the document with the automatic-transport document reading area 27*a*.

What is claimed is:

1. An image forming device provided with a transparent glass platen and a document transport device at the top thereof, the document transport device being hinged at one side thereof so as to open and close relative to a longitudinal axis of the image forming device and having a document transport unit at one end thereof in the direction of the hinging axis, a first document reading device for reading a document being disposed below the platen, and there being defined on the top side of the platen, successively from the upstream side in the direction of transport of the document which is automatically transported along a document transport path by the document transport unit, an automatic-transport document reading area and a static document reading area, for reading, by the first document reading device, an automatically transported document and a document that is statically disposed on the platen, respectively, the image forming device comprising:

on the bottom side of the document transport device, a bottom plate that covers a portion thereof that faces the static document reading area, downstream in the direction of transport of the document, from the portion facing the automatic-transport document reading area, this bottom plate being supported so as to be able to open and close at the document transport device, and having as a swing pivot a swing axis that is orthogonal to the hinging axis at the terminus thereof that is distal with respect to the automatic-transport document reading area, the bottom side thereof being a pressure face to press down on a document placed on the static document reading area; and a document transport path bottom member, which constitutes a bottom side of the document transport path, which is disposed downstream from the automatic-transport document reading area on the document transport path, this document transport path bottom member being swingably supported by a document transport device main body, one end thereof being the center of swing and the other end thereof being a slide engagement unit configured to slidably engage the swinging end of the bottom plate, the bottom plate swinging in conjunction with the swing of this document transport path bottom member, the slide engagement unit comprises a groove formed in a side wall that is formed on the bottom plate so as to extend in parallel to the direction of swing of the bottom plate and a connecting pin provided on the end of the document transport path bottom member that connects with the bottom plate, the groove being inclined downward in the direction of the swinging end of the bottom plate.

2. The image forming device recited in claim 1, wherein a second document reading device is provided within the document transport unit for reading the surface of the document that is automatically transported by the document transport unit, which is opposite to the surface that is read at the automatic-transport document reading area, this second document reading device being disposed in a position opposite from the document transport path bottom member.

3. The image forming device recited in claim 1, wherein a handle is provided on the document transport path bottom member.

4. The image forming device recited in claim 1, wherein a locking means consisting of a locking pin provided on the document transport path bottom member and a hook provided on the interior side of the outer case of the document transport device for engaging with the locking pin is provided to serve to hold the bottom plate closed.

5. An image forming device provided with a transparent glass platen and a document transport device at the top thereof, the document transport device being hinged at one side thereof so as to open and close relative to a longitudinal axis of the image forming device and having a document transport unit at one end thereof in the direction of the hinging axis, a first document reading device for reading a document being disposed below the platen, and there being defined on the top side of the platen, successively from the upstream side in the direction of transport of the document which is automatically transported along a document transport path by the document transport unit, an automatic-transport document reading area and a static document reading area, for reading, by the first document reading device, an automatically transported document and a document that is statically disposed on the platen, respectively, the image forming device comprising:

on the bottom side of the document transport device, a bottom plate that covers a portion thereof that faces the static document reading area, downstream in the direction of transport of the document, from the portion facing the automatic-transport document reading area, this bottom plate being supported so as to be able to open and close at the document transport device, and having as a swing pivot a swing axis that is orthogonal to the hinging axis at the terminus thereof that is distal with respect to the automatic-transport document reading area, the bottom side thereof being a pressure face for pressing down on a document placed on the static document reading area; a document transport path bottom member, which constitutes a bottom side of the document transport path, which is disposed downstream from the automatic-transport document reading area on the document transport path, this document transport path bottom member being swingably supported by a document transport device main body, one end thereof being the center of swing and the other end thereof being a slide engagement unit for slidably engaging in the swinging end of the bottom plate, the bottom plate swinging in conjunction with the swing of this document transport path bottom member; and a biasing means for biasing the bottom plate in the direction that presses down on a document statically placed on the platen is mounted in the vicinity of both ends of the swing pivot of the bottom plate of the document transport device and in the vicinity of the connecting pin on the document transport path bottom member.

* * * * *